A. E. EASTWICK.
SAW.
APPLICATION FILED SEPT. 26, 1908.
917,565.
Patented Apr. 6, 1909.
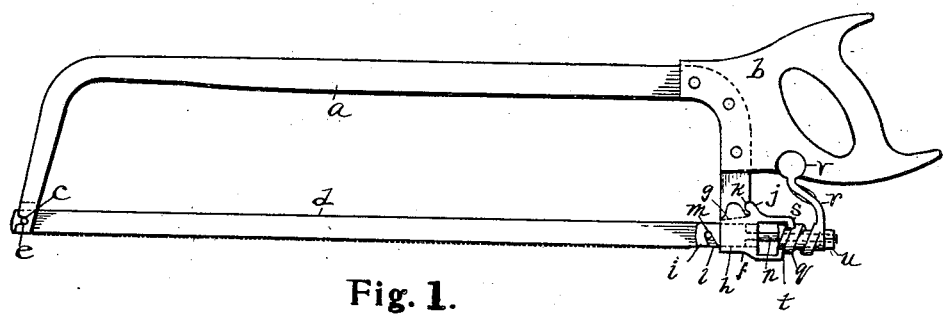
Fig. 1.
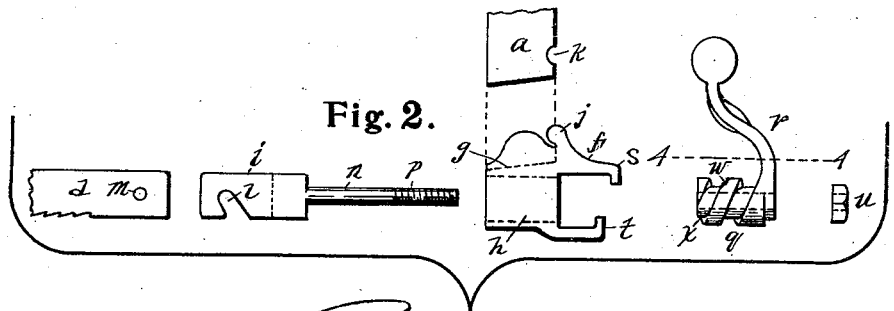
Fig. 2.
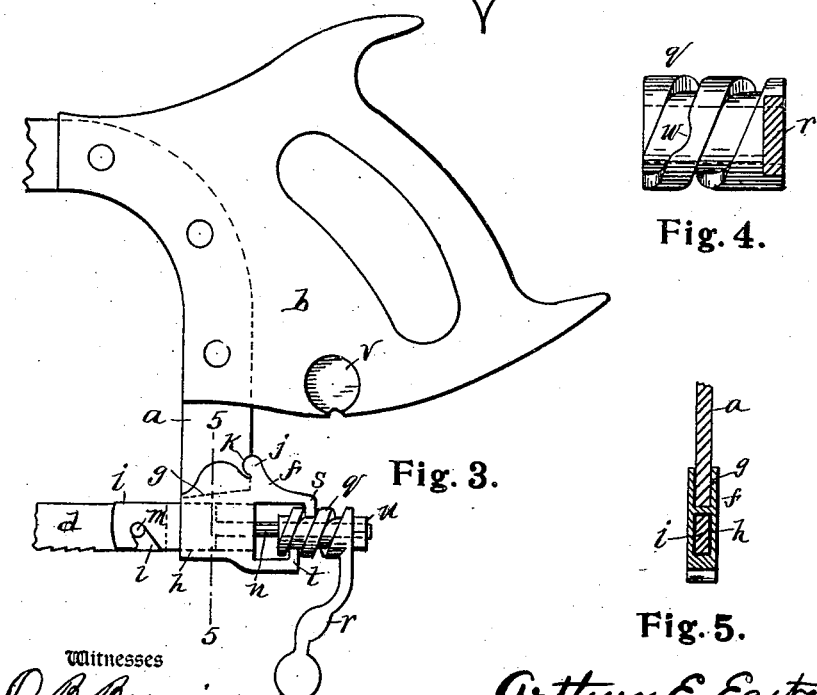
Fig. 3.
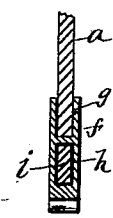
Fig. 4.
Fig. 5.
Witnesses
O. B. Baenziger.
G. E. McGraw.
Inventor
Arthur E. Eastwick
By Newell S. Wright
Attorney.

UNITED STATES PATENT OFFICE.

ARTHUR E. EASTWICK, OF DETROIT, MICHIGAN, ASSIGNOR OF ONE-HALF TO WILLIAM SUMMERS, OF DETROIT, MICHIGAN.

SAW.

No. 917,565.      Specification of Letters Patent.      Patented April 6, 1909.

Application filed September 26, 1908. Serial No. 454,842.

*To all whom it may concern:*

Be it known that I, ARTHUR E. EASTWICK, a citizen of the United States, residing at Detroit, in the county of Wayne and State of Michigan, have invented certain new and useful Improvements in Saws, of which the following is a specification.

My invention has for its object certain new and useful improvements in saws and relates more particularly to butchers' saws and to saws of an analogous construction.

More especially my invention relates to certain new and useful features whereby the saw blade may readily be removed and replaced, and whereby suitable tension may readily and effectually be applied to the saw blade when in position for use.

My invention consists in the general construction, combination, and arrangement of parts hereinafter described and claimed and illustrated in the accompanying drawings in which, Figure 1 is a view in side elevation. Fig. 2 represents in detail and in elevation certain parts of the invention. Fig. 3 is a view of portions of the apparatus assembled, the same being an enlarged view of parts shown in Fig. 1 and in elevation. Fig. 4 is an enlarged view of the worm showing the lever arm in section, the section being taken on the line 4—4 Fig. 2. Fig. 5 is a view in vertical section on the line 5—5 Fig. 3.

The aim of the applicant is to provide a saw of this description whereby the saw blade when dull may be quickly removed from the frame and a sharpened blade be readily engaged with the frame, improved means being employed for firmly engaging the blade with the frame.

In carrying out my invention *a* represents the saw frame, and *b* the handle. The frame, as is customary in saws of this character, is bent at its extremities. The upper extremity of the frame is shown herewith provided with a recess *c*, the said end of the frame being also bifurcated as indicated by the dotted line in Fig. 1, so that the end of the blade may be readily slipped into or between the bifurcated extremities of the outer end of the frame. The blade *d* is shown provided with a pin *e* to engage in the recess *c*. In this manner, it will be evident that the frame is provided with a blade seat at its outer extremity, and that the outer end of the saw blade is adjustably engaged therewith. Engaged with the opposite end of the frame is a draw bar holder indicated at *f*, said holder constructed with a recess as indicated at *g* to receive the adjacent end of the frame and with an orifice indicated at *h* to receive an adjustably removable draw bar indicated at *i*. The draw bar holder is detachably engaged with adjacent end of the frame, the holder being constructed with a shoulder or knob *j* to engage in a recess *k* upon the rear edge of the frame when the parts are assembled. The outer end of the draw bar is provided with an angular recess *l* wherein may be engaged a pin *m* on the adjacent end of the saw blade. The opposite end of the draw bar is provided with an arm *n* preferably threaded at its outer extremity as shown at *p*. Upon the arm *n* is located a worm *q* rotatable upon said arm, the worm being provided with an operating handle or lever *r*.

The draw bar holder is constructed with jaws *s* and *t* to oppositely engage in the channel or recess between the threads of the worm. The draw bar holder being stationary when engaged with the frame, it will be evident, that when the worm is moved to or fro upon the arm of the draw bar it will correspondingly move the opposite extremity of the draw bar either to loosen or tighten its connection with the saw blade as may be desired. Obviously a nut *u* upon the outer extremity of the threaded arm of the draw bar may be employed to adjust the relative positions of the worm and draw bar, and affording more or less movement of the worm thereupon. The inner end of the draw bar is preferably bifurcated as indicated to receive the adjacent end of the saw blade. It will readily be seen that the draw bar holder may be engaged with any saw frame of this nature by simply notching the frame as at *k*.

I prefer to provide the handle *b* with a recess *v* to receive the outer end of the lever arm *r*. It will be evident that the lever thus can only be thrown in one direction to relieve the strain upon the saw blade, and when returned to its seat *v* the blade will be properly tightened in the frame especially if the nut *u* is properly adjusted on the draw bar. The channels between the threads of the worm form a pocket for the shoulders *s*, *t*, of the holder, and the said shoulders may be practically locked with the worm to prevent accidental displacement by notching the proper thread of the worm as indicated at $w$ and $x$ to receive the shoulders of the holder when the devices are in operative position.

What I claim as my invention is:

1. A saw comprising a frame, a saw blade detachably engaged with one end of the frame, a draw bar holder detachably engaged with the opposite end of the frame, a draw bar movably located in said holder and detachably engaged with the adjacent end of the blade, and a worm engaged by said holder and movably engaged upon said draw bar.

2. A saw comprising a frame, a saw blade detachably engaged with one end of the frame, a draw bar holder engaged with the opposite end of the frame, a draw bar movably located in said holder and detachably engaged with the adjacent end of the blade, a worm engaged by said holder and movably engaged upon said draw bar, and an adjusting nut upon the outer end of the draw bar.

3. A saw comprising a frame, a saw blade detachably engaged with one end of the frame, a draw bar holder engaged with the opposite end of the frame, a draw bar movably located in said holder and detachably engaged with the adjacent end of the blade, and a worm engaged by said holder and movably engaged upon said draw bar, said holder provided with shoulders to engage in the recesses between the threads of the worm.

4. A saw comprising a frame, a saw blade detachably engaged with one end of the frame, a draw bar holder engaged with the opposite end of the frame, a draw bar movably located in said holder and detachably engaged with the adjacent end of the blade, and a worm engaged by said holder and movably engaged upon said draw bar, said holder provided with shoulders to engage in the recesses between the threads of the worm, said worm provided with pockets to receive said shoulders when the parts are in operative position.

In testimony whereof I have signed this specification in presence of two witnesses.

ARTHUR E. EASTWICK.

Witnesses:
N. S. WRIGHT,
G. E. McGRANN.